Patented Mar. 26, 1935

1,995,564

UNITED STATES PATENT OFFICE 1,995,564

WATERSOLUBLE AZODYESTUFFS

Heinrich Clingestein, Cologne-on-the-Rhine, and Friedrich Schubert, Leverkusen-I. G. Werk, Germany, assignors to General Aniline Works, Inc., New York, N. Y., a corporation of Delaware No Drawing. Application November 19, 1932, Serial No. 643,530. In Germany November 24, 1931

6 Claims. (Cl. 260—78)

The present invention relates to a process of preparing new watersoluble azodyestuffs and to the new products obtainable thereby, more particularly it relates to dyestuffs which are characterized by containing at least once the group:

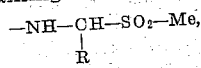

wherein R stands for hydrogen, an alkyl or phenyl radical and Me stands for a monovalent metal radical.

Our new dyestuffs are obtainable by starting with any azodyestuff containing at least one nitro group or nitroso group in the molecule and treating the same in aqueous alkaline medium with a mixture of an aliphatic aldehyde or aromatic aldehyde of the benzene series and a watersoluble salt of hyposulfurous acid ($H_2S_2O_4$) or with the addition compound of the aldehyde and a watersoluble salt of sulfoxylic or hyposulfurous acid.

As starting azodyestuffs there come into consideration any azodyestuffs containing at least one nitro or nitroso group, such as mono- dis- tris- and poly-azodyestuffs containing a nitro or nitroso group as substituent and which may bear besides any other substituents.

As aldehydes there may be mentioned by way of example, formaldehyde or substances yielding formaldehyde, such as paraldehyde, the homologues of formaldehyde, such as acetaldehyde, propionic aldehyde and aldehydes of the benzene series, such as benzaldehyde, or nuclear substitution products thereof.

In carrying out our new process it is self-understood that there must be worked with at least such a quantity of the aldehyde and sulfoxylate as is sufficient for transforming the nitro or nitroso group into the group:

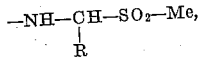

Me and R meaning the same as stated above.

Our new process is carried out in an aqueous alkaline reacting agent, such as in aqueous solution or suspension of the azodyestuff, with the addition of an alkali, such as caustic soda, soda or sodium bicarbonate, with slowly heating, say between about 30 and 80° C. A preferred method of carrying out the process consists in working at temperatures between about 40 and 60° C. and with an excess of the theoretical quantity of aldehyde and sulfoxylic acid; sodium sulfoxylate generally being used in our preferred method.

Compared with the starting azodyestuffs the new azodyestuffs obtainable in accordance with our new process are distinguished by a highly increased solubility in water. The shades of the new dyestuffs are similar to those obtained with the corresponding starting azodyestuffs.

In carrying out our new process it is surprising that thereby are obtained products which still have the constitution of azodyestuffs. It rather could be expected that the azo-bridge or -bridges would be split up with the formation of the corresponding amines by the action of sulfoxylic or hyposulfurous acid (compare "Anwendung von Hyposulfit und formaldehyd-sulfoxyl-schwefelsaurem Natrium als Ätzmittel, Houben, Die Methoden der organischen Chemie", 2nd edition, 1922, vol. 2, page 354).

The invention is illustrated by the following examples, without being limited thereto:

*Example 1.*—461 grams of the dyestuff which has been prepared by coupling the nitrated diazo compound of the 1-amino-2-hydroxynaphthalene-4-sulfonic acid with α-naphthol, are dissolved with excess caustic soda in 600 ccs. of water and stirred for a short time at 50° C. with an aqueous solution of 462 grams of formaldehyde-sodium-sulfoxylate. The greenish-blue solution is rendered weakly alkaline by means of 10% aqueous acetic acid, and the dyestuff of the following formula:

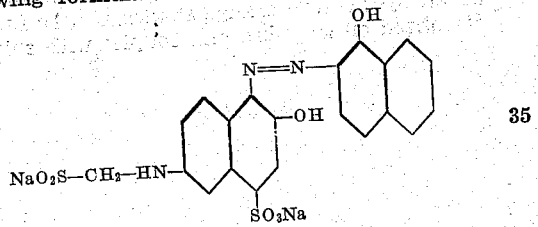

is salted out. It dyes wool copper-violet shades which by after-chroming turn to deep black.

*Example 2.*—572 grams of the dyestuff which is obtained in accordance with the example of U. S. Patent 1,429,781 by coupling diazotized 4-nitro-1-aminobenzene-2-sulfethylanilide with 2-amino-8-hydroxynaphthalene-6-sulfonic acid in an acid medium, are made into a paste with water and some alcohol, and introduced in the course of one hour at 50–60° C. into a mixture of 700 ccs. of water and 200 ccs. of alcohol, while simultaneously adding 462 grams of formaldehyde-sodium-sulfoxylate and 40 grams of sodium hydroxide. By means of diluted hydrochloric acid the solution is rendered weakly alkaline, and the dyestuff of the following formula:

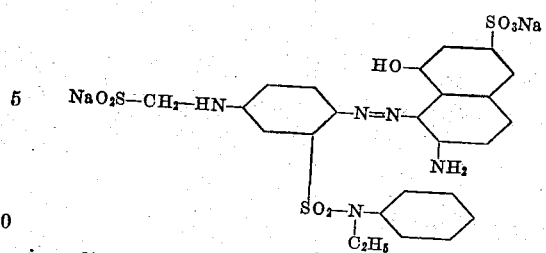

is salted out by the addition of common salt. In its dry state the dyestuff represents a brown powder, being easily soluble in water.

*Example 3.*—644 grams of the dyestuff being obtainable by coupling diazotized benzidine with 1-(p-nitrophenyl)-3-methyl-5-pyrazolone, are made into a paste with some water and alcohol. Then the paste simultaneously with 462 grams of formaldehyde-sodium-sulfoxylate and about 100–150 ccs. of 40% aqueous caustic soda is gradually introduced, with stirring, into a mixture of 500 ccs. of water and about 100 ccs. of alcohol at a temperature of 50–60° C. After about one hour the dyestuff has entered into solution. After this the solution is rendered weakly alkaline by means of dilute hydrochloric acid. The dyestuff of the following formula:

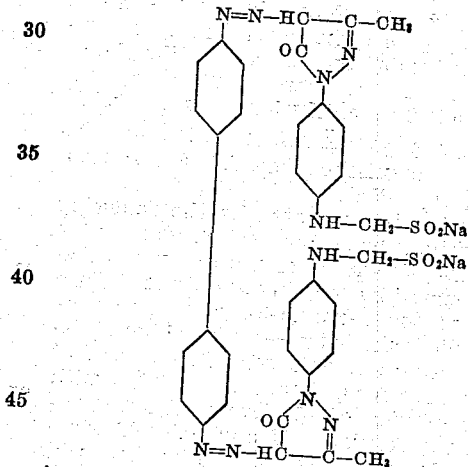

is completely precipitated by the addition of common salt. The dyestuff is easily soluble in water, dyes cotton orange shades, can be further diazotized on the fibre and couples with suitable coupling components, thereby other shades being obtainable.

We claim:

1. The process which comprises reacting upon an azodyestuff containing a substituent of the group consisting of the nitro and nitroso group with a compound of the group consisting of an aliphatic aldehyde and an aldehyde of the benzene series and with a compound of the group consisting of a water-soluble salt of sulfoxylic acid and hyposulfurous acid in aqueous alkaline medium at a temperature between about 30 and about 80° C.

2. The process which comprises reacting upon an azodyestuff containing a substituent of the group consisting of the nitro and nitroso group with a compound of the group consisting of an aliphatic aldehyde and an aldehyde of the benzene series and with an alkali metal sulfoxylate in aqueous alkaline medium at a temperature between about 30 and about 80° C.

3. The process which comprises reacting upon an azodyestuff containing a substituent of the group consisting of the nitro and nitroso group with formaldehyde and with sodium sulfoxylate in aqueous alkaline medium at a temperature between about 30 and about 80° C.

4. Azodyestuffs containing at least once the group

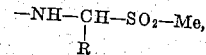

wherein R stands for hydrogen, an alkyl or phenyl radical and Me stands for a monovalent metal radical, being soluble in water, and dyeing fibres various shades.

5. Azodyestuffs containing at least once the group

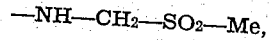

wherein Me stands for a monovalent metal radical, being soluble in water, and dyeing fibres various shades.

6. Azodyestuffs of the general formula:

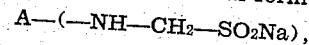

wherein A stands for the radical of an azodyestuff, being soluble in water, and dyeing fibres various shades.

HEINRICH CLINGESTEIN.
FRIEDRICH SCHUBERT.